July 10, 1945. H. A. DOERNER 2,380,097
SLUDGE SEPARATOR
Original Filed Dec. 30, 1940

HENRY A. DOERNER
INVENTOR

BY O. W. Lee
ATTORNEY

Patented July 10, 1945

2,380,097

UNITED STATES PATENT OFFICE 2,380,097

SLUDGE SEPARATOR

Henry A. Doerner, Pullman, Wash.

Original application December 30, 1940, Serial No. 372,293. Divided and this application January 23, 1943, Serial No. 473,324

3 Claims. (Cl. 183—25)

The present invention relates to certain new and useful improvements in a sludge separator for handling a finely dispersed mist containing minute particles of solids enveloped in small globules of a volatile liquid and intermingled with vapors of that liquid and comingled gas, so as to separate a thick sludge of the liquid and solids, and conduct the vapors and gases away, for separation by condensation.

The invention is a division of my application Serial No. 372,293, filed December 30, 1940, for a Process for producing magnesium metal, and is particularly efficient for that special purpose. That application has since matured into Patent No. 2,328,202, issued August 31, 1943.

The separator is maintained at a constant temperature so as to control the amount of liquid condensed, and a rapidly driven rotor with blades and staggered baffles, is employed to cause the blobules of mist containing the fine particles of solids to coalesce at the periphery of the separator where the thick sludge is kept constantly circulating by the blades, and is urged out through a longitudinal slot in the separator, where it is received by a pipe which connects with a pump used to force the sludge to the location desired.

The invention first forms the finely dispersed mist into a sludge and then removes the sludge from the gases and vapor which are conducted away for separation from each other.

Materials of this kind are difficult to handle and the present invention was devised after other means had been found unsatisfactory and failed to effectually coalesce the mist and separate the sludge. The invention has been reduced to practice and fully tested by continuous operation twenty-four hours a day for long periods.

Figure 1:
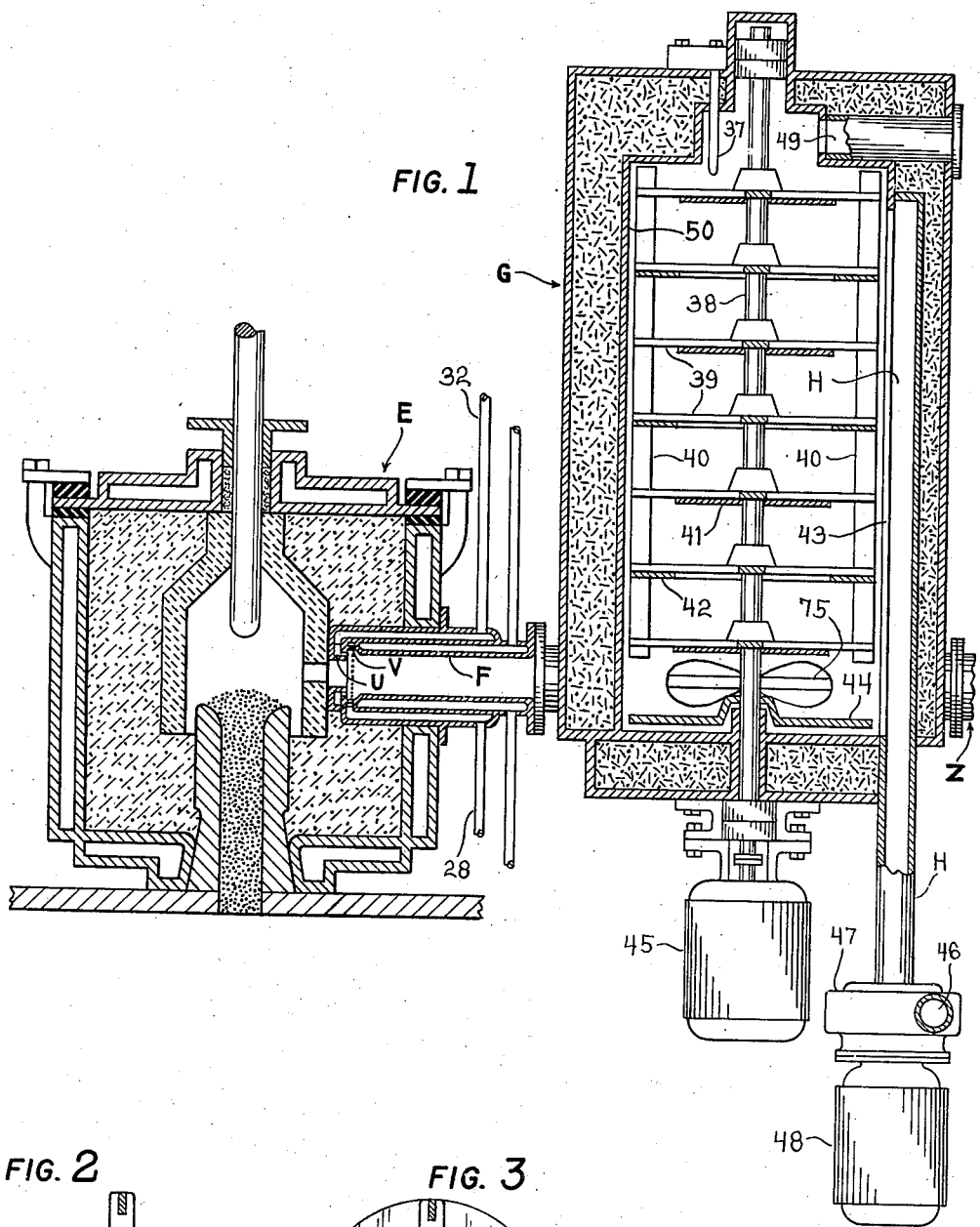
Fig. 1 shows a vertical section of the invention connected to a thermal reduction furnace by a spray flue.

The separator is generically indicated at G and comprises a closed cylindrical casing 50 which is thermally insulated and provided with a thermocouple 37 for sensing the temperature therein, which should be maintained constant. A shaft 38 is rotatably mounted axially within this casing, and rapidly driven by a motor 45. A number of spider heads such as 39 are secured to this shaft in spaced apart relation, and blades 40 are disposed longitudinally of this casing and secured to the ends of the arms of these spider heads. Disc baffles such as 41 and annular baffles such as 42 are secured to the respective spider heads in an alternate arrangement so as to provide a staggered relation forming a zigzag path through the separator.

Figure 2:
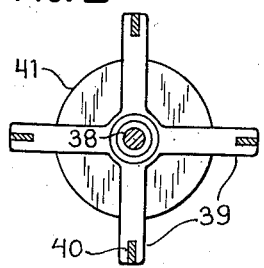
Fig. 2 shows one of the spider heads with a round central baffle.
Figure 3:
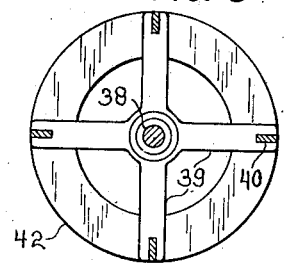
Fig. 3 shows one of the spider heads with a peripheral ring baffle.

As will be seen from Figs. 2 and 3 these baffles 41 and 42 can be conveniently cut from sheet metal, the disc baffle 41 being the piece removed to form the opening in the annular baffle 42. As shown in Fig. 3 the annular baffles 42 are notched out and saddled over the blades 40 so that the periphery of these baffles extend outwardly as far as the edge of the blades, and it will be seen from Fig. 1 that this forms zones along the blades to retard gravitation of sludge within the separator, so as to distribute the discharge full length of the slot 43.

A sludge pipe H is disposed longitudinally of the casing and secured to the outside thereof and the longitudinal slot 43 communicates between the casing 50 and the sludge pipe H, so as to provide for the sludge to be forced out of the separator and into this sludge pipe H which leads to a pump 47 having an outlet pipe 46 through which the sludge is forced to a desired location, the pump being driven by a motor 48.

One end of the separator is connected to a spray flue F and the opposite end of the separator is provided with an outlet 49 for conducting away gases and vapors so that they can be subsequently separated by condensation. This spray flue F connects to the orifice of the thermal reduction furnace E which is the same as disclosed in my aforesaid application and need not be described here. This spray flue F is provided with an annular spray channel V having a multiplicity of orifices opening into the flue, and liquid under pressure is supplied through the pipe 28 so as to be sprayed into this flue. A second annular channel U has a multiplicity of orifices opening into the flue, and gas under pressure is supplied through the pipe 32 to atomize the liquid spray.

It should be mentioned that the liquid can be fed through either of these spray channels, either with or without gas pressure in the other channel, because the metal vapor issues from the furnace E in a blast sufficient to atomize most of the unvaporized liquid, and the gas atomization is employed to afford better atomization and more rapid vaporization to effect quicker cooling of the metal vapors to the condensation temperature, so as to enhance efficiency.

For temperature control, this flue F is preferably water jacketed as shown.

It will be noted that the blades 40 do not extend to the bottom of the separator. This is to provide clearance for a reamer 75 which extends tangentially through the separator and is operated by a device coupled at Z which is no part of the present invention, but disclosed in my aforesaid application.

To keep the bottom of the separator clear of sludge, a spider head 44 is secured to the lower part of the shaft 38 so as to urge the sludge out through the lower part of the slot 43 and into the pipe H.

In operation the metal vapors issue as a blast from the thermal reduction furnace E into the flue F where the spray of liquid such as liquid hydrocarbons, quickly cools the metal vapors so that they condense in very fine particles which are enveloped in the tiny globules of that portion of the atomized liquid remaining unvaporized, which should be only a small percentage of the total, so as to minimize the amount of the liquid to be collected in the sludge.

This atomized mist containing the minute particles of metal passes into the separator along with the vapors of the volatilized liquid, furnace gas, and any gas that may be formed in the flue F. This mixture of vapors, gas, liquid and solids must follow a zig-zag path in order to pass the several described baffles, during which time the rapidly driven spider heads carrying the blades 40, constantly urge the globules of mist with their entrapped solids in a radial direction until they contact the cylindrical casing where they are carried around the casing so as to coalesce them into a thick sludge which the blades 40 urge out through the slot 43 into the sludge pipe H which may either lead to a collection tank or be coupled to a pump as here shown. The vapors and gases having followed a devious path through the baffles and being freed from liquids and solids, escape through the outlet 39 and can be conducted away for separation of the vaporized liquid by condensation so that it can be repeatedly used.

The invention has been thoroughly tested in the production of magnesium metal by thermal reduction of MgO and carbon as disclosed in my aforesaid application, and will efficiently separate the thick sludge which is essentially necessary for commercial practicability of the process disclosed therein.

The separator is here shown in the vertical position which is preferable, but satisfactory operation can also be had with the separator in a horizontal position. It will also be understood that in utilizations where a reamer is not required, the inlet to the separator may be disposed in any suitable position.

In the present application, I claim as my invention:

1. A sludge separator comprising a vertical cylindrical casing, a shaft rotatably mounted axially of said casing, spider heads secured to said shaft in spaced apart relation, blades disposed longitudinally of said casing and secured to the arms of said spider heads, disc baffles and annular baffles alternately arranged and secured to said spider heads, said annular baffles each being notched out and saddled over said blades with the periphery extending to the outer edge of the blades so as to form zones along the length of said blades to retard gravitation of sludge within the separator, a sludge pipe disposed longitudinally of said casing on the outside thereof and communicating therewith by a longitudinal slot, an inlet at one end of said casing, and a gas outlet at the opposite end of said casing.

2. A sludge separator comprising a vertical cylindrical casing, a spray flue for tangentially connecting one end of said casing to a source of metal vapor to be condensed by major vaporization of a liquid sprayed into said flue, a gas outlet at the opposite end of said casing, a shaft rotatably mounted axially of said casing, spider heads secured to said shaft in spaced apart relation above the entrance of said tangential flue, blades disposed longitudinally of said casing and secured to the arms of said spider heads, disc baffles and annular baffles alternately arranged and secured to said spider heads, a sludge pipe disposed longitudinally of said casing on the outside thereof and communicating therewith by a longitudinal slot extending to the bottom of said casing, and a spider head secured to said shaft at the bottom of said casing to clear any sludge from the bottom of said casing and urge it out through the slot into said sludge pipe.

3. A sludge separator comprising a vertical cylindrical casing, a spray flue for tangentially connecting one end of said casing to a source of metal vapor to be condensed by major vaporization of a liquid sprayed into said flue, a gas outlet at the opposite end of said casing, a shaft rotatably mounted axially of said casing, spider heads secured to said shaft in spaced apart relation above the entrance of said tangential flue, blades disposed longitudinal of said casing and secured to the arms of said spider heads, disc baffles and annular baffles alternately arranged and secured to said spider heads, said annular baffles each being notched out and saddled over said blades with the periphery extending to the outer edge of the blades so as to form zones along the length of said blades to retard gravitation of sludge within the separator, a sludge pipe disposed longitudinally of said casing on the outside thereof and communicating therewith by a longitudinal slot extending to the bottom of said casing, and a spider head secured to said shaft at the bottom of said casing to clear any sludge from the bottom of said casing and urge it out through the slot into said sludge pipe.

HENRY A. DOERNER.